3,009,858
3-(β-HALOETHYL) ENOLETHER OF CORTISONE
ACETATE
Alberto Ercoli, Via Circo 12, Milan, Italy
No Drawing. Filed May 4, 1960, Ser. No. 26,716
Claims priority, application Germany May 4, 1959
15 Claims. (Cl. 167—65)

This invention relates to novel hormonal compositions and is more particularly concerned with compositions containing cortisone or hydrocortisone and certain derivatives thereof, as will appear hereinafter, in the form of a 3-enol ether, whereby the oral administration of the adrenal hormone results in greatly increased physiological effects.

Cortisone and hydrocortisone and a number of their derivatives are well known steroids which exhibit several physiological functions. The discovery that cortisone and hydrocortisone are present in the glandular extracts and can be extracted from the adrenal glands has led to the view that they are the main endocrine substances fabricated by the adrenal cortex. Comparative assays in experimental animals and in man have shown that cortisone and hydrocortisone possess qualitatively similar physiological properties.

These compounds, though recommended for the treatment of adrenal and pituitary insufficiency, are used for a large variety of diseases, that is for non-specific purposes which require much higher dosage levels than the physiological ones. Cortisone and hydrocortisone are useful in therapeutics, but at high doses they are also dangerous drugs. When a state of hormonal excess is induced, undesirable physical and psychic symptoms appear and, in prolonged therapy, atrophy and hypofunction of the adrenal cortex also occurs.

It is of importance that methods should be developed for increasing the potency of these physiological substances in order to reduce the high dosage levels now required to achieve therapeutic benefit, and to ensure a lesser incidence of undesirable side effects.

It is therefore an object of this invention to provide adrenocortical compositions which possess a greater potency than those shown by other preparations of cortisone and hydrocortisone.

Another object of the invention is to provide new compounds for use in such compositions and a further object of the invention is to provide a process for carrying out steroid therapy in humans employing the compositions.

It has now been found that the physiological properties of cortisone and hydrocortisone and certain derivatives thereof can be greatly potentiated when they are given orally in the form of their 3-enol ethers. These simple transformation derivatives, which present an etherified $\Delta^{3,5}$-3-hydroxy grouping instead of the original $\Delta^4$-3-keto group, are powerful hormonal agents showing unexpected physiological properties by oral route. It is to be noted that the parenteral administration of these compounds shows, on the contrary, a lesser degree of activity.

Accordingly, the invention provides a hormonal preparation adapted for oral administration comprising a 3-enol ether of cortisone or hydrocortisone or certain derivatives thereof, including their 21-esters, dissolved or mixed in a non-toxic, liquid or solid, pharmaceutical carrier.

Advantageous compounds for the compositions of this invention are alkyl, cycloalkyl, aralkyl and aryl enol ethers of free or acylated cortisone and hydrocortisone. Preferred and advantageous compounds are alkyl enolethers having a straight or branched chain containing one to seven carbon atoms, the alkyl radicals being unsubstituted or substituted, for instance, with halogen (fluoro or chloro), alkoxy, carboxy or carbalkoxy groups. Particularly, 3-(β-chloroethyl) enolether and 3-(β-fluoroethyl) enolether of cortisone acetate exhibit an exceptionally high glucocorticoid and anti-inflammatory activity.

In addition to the above-identified enol ethers of free or acylated cortisone and hydrocortisone, there may be employed in forming the compositions of the present invention, the corresponding enol ethers of a number of known free or acylated derivatives of cortisone and hydrocortisone, these derivatives often exhibiting a potentiated activity. Thus there may be used the alkyl (free or substituted), cycloalkyl, aralkyl and aryl enol ethers of 6-lower alkyl cortisone, 6-lower alkyl hydrocortisone, 6-chloro and 6-fluoro cortisone, 6-chloro and 6-fluoro hydrocortisone, 16α- or 16β-lower alkyl cortisone, 16α- or 16β- lower alkyl hydrocortisone, 16α-hydroxy cortisone, 16α-hydroxy hydrocortisone, 16-methylene cortisone, 16-methylene hydrocortisone and the 9α-fluoro derivatives of cortisone, hydrocortisone and the above-enumerated derivatives thereof, as well as the 21-acylates of all of said enol ethers. In each instance the lower alkyl radical will preferably be methyl.

The assays carried out in animals and in man (i.e., anti-inflammatory tests, liver glycogen deposition tests, thymus involution and sodium-potassium excretion) have shown that enol ethers of cortisone or hydrocortisone possess on oral administration physiological properties qualitatively equal to those of cortisone and hydrocortisone but from two to five times more potent.

This increase in the physiological effects is a true potentiation of the hormonal properties of cortisone and hydrocortisone and not mere delayed action which may be effected by various technical devices, for example, by esterifying the 21-hydroxy group of the hormone with a suitable organic acid.

Comparative studies have also shown that the effectiveness of the 3-enol ethers of cortisone and hydrocortisone is from a quantitative point of view nearly similar to that of prednisone and prednisolone, that is of $\Delta^1$-dehydro-derivatives of the naturally occurring hormones. In comparison with prednisone and prednisolone they have the advantage of being more easily prepared and cheaper, besides the not negligible fact in the case of the enol derivatives of cortisone and hydrocortisone, of being reversible derivatives of physiological products.

It is believed, although this has not been established with certainty, that the reason that the 3-enol ethers of cortisone and hydrocortisone exhibit greater activity than the naturally occurring hormones when they are used in the compositions of the present invention for oral administration is that the presence of another double bond, established in the molecule, is in some way responsible for the increased physiological effectiveness.

The compositions of this invention can be administered in dosage unit form comprising at least one of the enol ethers mentioned above and a non-toxic pharmaceutical carrier. The non-toxic pharmaceutical carrier may be, for example, either a solid or a liquid. Examples of solid carriers are lactose, starch, gelatin, talc, stearic acid, or other fatty acids, cocoa butter, lard or other animal fats, magnesium stearate, terra alba, sucrose, agar, pectin and gum acacia. The liquid carriers include, preferably, peanut oil, olive oil, sesame oil, lard oil, linseed oil, sunflower seed oil, soya bean oil, wheat germ oil and egg yolk oil. The carrier or diluent may include a time delay material such as glycerylmonostearate or glyceryl distearate, alone, or in admixture with a wax.

Several pharmaceutical forms of the therapeutically useful compositions can be used. For example, if a solid carrier is used, the compositions may take the form of tablets, linguets, powder, capsules, troches, or lozenges, prepared by standard pharmaceutical techniques. It is advisable to stabilize such compositions by adding suitable buffer substances or alkaline earth substances in order to prevent the 3-enol ethers from hydrolyzing in an acidic medium. When a liquid carrier is used, the obtained solution after subdividing in bottles or dosage unit forms, can be considered ready for administration or can also be prepared in the form of a syrup or a liquid suspension, or preferably the solution, itself, can be introduced in capsules, e.g. of gelatine or other material soluble or disintegrable in the alimentary tract.

In the compositions of this invention, the 3-enol ethers are present in an amount sufficient to produce therapeutic effects. In general, the amount is from about 0.1 mg. to about 40 mg. preferably from about 1 mg. to about 25 mg. per dosage unit.

The method of this invention comprises orally administering to humans, in an amount sufficient to produce therapeutic effects, cortisone or hydrocortisone 3-enol ethers, in admixture with a non-toxic pharmaceutical carrier as exemplified above. The daily dosage of 3-enol ethers will be in an amount of from about 1 mg. to about 100 mg. and preferably from about 2 mg. to about 40 mg. The administration is by the oral route, in equal doses, one to three times daily.

The compositions of this invention can also contain some small amounts of other substances, as for instance 3-enol ethers of other adrenal hormones such as desoxy- and dehydrocorticosterone. There may, if desired, be added to the compositions of the invention pharmaceutically acceptable agents such as antiseptics, antioxidants, preservatives or other buffer substances to prolong the stability of the active ingredients and prevent them from oxidizing or hydrolyzing.

The 3-enol ethers of the present invention can be prepared in any desired way.

Thus, the lower alkyl enol ethers can be readily obtained by the action of a lower alkyl orthoformate on the corresponding free $\Delta^4$-3-ketone. The reaction can be carried out both at room temperature and by heating the reaction mixture or by adding to the alkyl orthoformate, a proportion of the alcohol corresponding to the alkyl radical which it is desired to introduce. The reaction is carried out in the presence of small amounts of an acid catalyst such as an aromatic sulphonic acid. By following this procedure, it is possible to obtain, with good yields and in a chemically pure state, the ethyl, propyl, n and iso, butyl, n and iso, enol ethers of free or acylated cortisone, hydrocortisone and the above-listed derivatives thereof.

The preparation of other alkyl enol ethers, especially those substituted with functional groups such as halo, alkoxy and carbalkoxy groups, as well as of the cyclo and aralkyl enol ethers, can be brought about by using the exchange reaction disclosed in copending application Serial No. 26,711, filed of even date herewith entitled "Process for the Preparation of Enolethers of $\Delta^4$-3-Ketosteroids." This method comprises treating a preformed ethyl enol ether with an excess of the desired aliphatic, arylaliphatic or cycloaliphatic alcohol in the presence of an acid catalyst. Suitable catalysts are the aromatic sulphonic acids such as toluene, benzene and naphthalene sulphonic acids as well as the Lewis acids.

The exchange reaction can be carried out in solution in a non-polar solvent such as benzene, cyclohexane, dioxan or tetrahydrofuran. It is advisable to perform the exchange using the same solution as that which results from the preparation of the enol ethyl ether, instead of isolating it and purifying before the next step.

Though the exchange method is capable of wide application, the preparation of certain enol ethers, particularly benzyl enol ethers, appears to be easier by applying the enol etherification method directly.

For this purpose it is advisable to treat the $\Delta^4$-3-ketosteroid, free or esterified, with the desired alcohol according to the procedure described in U.S. Patent No. 2,835,667, that is by employing isooctane, as azeotropic carrier to remove water from the reaction mixture.

The following examples are illustrative of the compositions and methods of this invention but they are not to be construed as limiting.

EXAMPLE 1

To a suspension of 5 g. of cortisone acetate in 30 cc. of dioxan are added 5 cc. of methyl orthoformate, 4.8 cc. of dry methyl alcohol and 75 mg. of p-toluenesulphonic acid. The resulting reaction mixture is stirred at room temperature (about 20° C.) until the solids are dissolved, then allowed to stand for about 30 minutes after which a few drops of pyridine are added and then the liquid is evaporated to dryness in vacuo. The residue on recrystallization from methyl alcohol yields the 3-enol methyl ether of cortisone acetate, melting point 189–192° C.; $[\alpha]_D = +20.5°$ (dioxan).

In the same manner as above and substituting for methanol and methyl orthoformate, propanol and propyl orthoformate, the corresponding 3-enol propyl ether of cortisone acetate is obtained, melting at 178–183° C.; $[\alpha]_D = +20.9°$ (dioxan). Similarly 3-enol isopropyl ether of cortisone acetate is obtained at M. Pt. 187–191° C.; $[\alpha]_D = +22.8°$.

By careful hydrolysis in an alkaline medium the products give the corresponding enol ethers of cortisone as the free alcohol.

EXAMPLE 2

A mixture of 3 g. of cortisone oenanthate, 75 cc. of ethylene bromide, 300 cc. of isooctane, 2.5 cc. of benzyl alcohol and 120 mg. of p-toluene sulphonic acid is refluxed for 32 hours employing an apparatus (similar to that described in Org. Synt. 3, page 282) which is equipped so that the isooctane, falling from the condenser before returning to the flask, is separated from the water entrained by it, by means of a trap supplied with an inner funnel containing phosphorus pentoxide mixed with a filter aid (e.g. celite). After cooling, 10 cc. of pyridine are added to neutralize the p-toluene sulphonic acid and the liquid is completely evaporated to dryness in vacuo. The solid residue on recrystallization from methanol containing a little pyridine, is collected by filtration, washed with methanolpyradine, and dried in vacuo to yield 1.9 g. of 3-enol benzyl ether of cortisone oenanthate.

In the same manner as above 3-enol benzyl ether of cortisone acetate is obtained at melting point 204–205° C.

EXAMPLE 3

A mixture of 8 g. of cortisone oenanthate, 50 cc. of tetrahydrofuran, 8 cc. of ethyl orthoformate, 8 cc. of absolute ethyl alcohol and 60 mg. of benzene sulphonic acid is stirred and maintained at room temperature (from about 15° C. to about 30° C.) until the solids dissolve. The resulting solution is poured into a two litres flask containing 500 cc. of anhydrous benzene and 20 cc. of n-hexyl alcohol and the mixture heated to reflux for forty minutes. The solution is then neutralized and the liquid evaporated to dryness in vacuo.

The residue on recrystallization from methanol containing a little pyridine consists of 3-enol n-hexyl ether of cortisone oenanthate, M.P. 105–7° C.; $[\alpha]_D = +2°$ (1% in dioxan). The yield of pure enol ether is greater than 80% of the theoretical amount.

Following the same procedure, 3-enol n-hexyl ether of cortisone acetate is readily obtained; melting point 143–144° C.; $[\alpha]_D = +18.5°$ (0.5% in dioxan). Alkaline hydrolysis provides the corresponding 3-enol hexyl ether of cortisone as the free alcohol, M.P. 139–141° C.; $[\alpha]_D = -18.4°$ (dioxan). Similarly, 3-enol cyclopentyl ether of cortisone acetate, M.P. 176–178° C. is obtained and converted into the corresponding enol ether of cortisone as the free alcohol.

EXAMPLE 4

A suspension of 1 g. of hydrocortisone, 12 cc. of tetrahydrofuran, 2 cc. of ethanol and 2 cc. of ethyl orthoformate is heated until dissolved and then cooled, 20 mg. of p-toluene sulphonic acid are added and the resulting mixture is stirred and maintained at room temperature for about one hour. On neutralization with a little pyridine and cooling to a temperature below about 5° C. the desired 3-enol ethyl ether of hydrocortisone acetate separates. The product, recrystallized from methyl alcohol containing a few drops of pyridine, melts at 156–158° C.; $[\alpha]_D = -27°$ (dioxan).

In the same manner 3-enol ethyl ether of hydrocortisone as the free alcohol is obtained, melting point 193–195° C.; $[\alpha]_D = -70°$ (dioxan).

Analogously, hydrocortisone 3-enol propyl ether melting at 174–5° C., $[\alpha]_D = -63°$ (dioxan) and 3-enol isopropyl ether melting at 167–170° C., $[\alpha]_D = -61°$ (dioxan) are prepared.

EXAMPLE 5

20 g. of 3-enol ethyl ether of cortisone acetate in benzene solution are mixed with 50 cc. of sec-butyl alcohol and 0.2 g. of p-toluene sulphonic acid. The mixture is heated and distilled for about thirty minutes, so that the ethyl alcohol which formed during the reaction is completely removed. To the residual solution, a few drops of pyridine are added and the mixture concentrated under vacuum. The residue taken up with ether, filtered, dried, and then recrystallized from methanol containing a trace of pyridine yields 18 g. of 3-enol sec-butyl ether of cortisone acetate, melting point 187–192° C.; $[\alpha]_D = +20.5°$ (dioxan).

In the same manner as above, 3-n-butyl enol ether of cortisone acetate is obtained melting at 152–155° C. $[\alpha]_D = +17.8°$ (dioxan).

Similarly, 3-amyl enol ether of cortisone acetate is obtained at melting point 151–153.5° C. $[\alpha]_D = +17.7°$ (dioxan) and converted by careful hydrolysis in an alkaline medium, into the corresponding 3-amyl enol ether of cortisone as the free alcohol, melting point 149–152° $[\alpha]_D = -18.2°$ (dioxan).

EXAMPLE 6

Following the same procedure as in Example 5 and substituting sec-butyl alcohol by 4-chlorobutyl alcohol, the corresponding 4-chlorobutyl enol ether of cortisone acetate is obtained. Similarly, ethyl enol ether of cortisone acetate is treated with ethylene chlorohydrin and converted to the β-chloroethyl enol ether of cortisone acetate melting at 176–178° C.

A similar reaction with ethylene fluorohydrin yields the corresponding β-fluoroethyl enol ether of cortisone acetate, melting at 168–170° C.

EXAMPLE 7

By treating ethyl enol ether of cortisone acetate with methylglycolate as in Example 5, there is obtained carbomethoxymethyl enol ether of cortisone acetate, melting point 190–192° C. The reaction with 2-methoxyethanol provides (2-methoxy)ethyl enol ether of cortisone acetate melting at 134–136° C.

EXAMPLE 8

To 800 cc. of benzene, 60 mg. of p-toluenesulphonic acid are added and a portion of the solvent is distilled off azeotropically to remove any possible trace of moisture. A mixture of 5 g. of 3-enol ethyl ether of cortisone acetate and 12 cc. of heptyl alcohol is added and distillation is continued again for about 40 minutes. The resulting solution is then neutralized with pyridine and the liquid evaporated in vacuo. The residue on crystallization from methanol containing a little pyridine consists of 3-enol heptyl ether of cortisone acetate, M.P. 141.5–143.5° C.; $[\alpha]_D = +17.1°$ (dioxan).

In the same manner as above, 3-enol hepytl ether of cortisone cyclopentylpropionate is obtained starting with the corresponding 3-enol ethyl ether of cortisone cyclopentylpropionate (M.P. 174–175° C.). By hydrolysis in an alkaline medium the corresponding 3-heptyl enolether of cortisone as the free alcohol is obtained melting at 131–135° C.; $[\alpha]_D = -17.5°$ (dioxan).

EXAMPLE 9

Reacting 25 g. of cortisone with 32 cc. of ethyl orthoformate and 40 cc. of dry ethanol, according to the Example 1, gives 3-enol ethyl ether of cortisone M.P. 185–187° C.; $[\alpha]_D = -25°$. The product (23 g.) is dissolved by gentle heating in 920 cc. of sesame oil. The solution is sealed in 2 cc. ampoules, each containing 50 mg. of 3-enol ethyl ether of cortisone, thus providing a liquid preparation administrable orally by drops.

EXAMPLE 10

To a solution of 1 g. of 6β-chloro cortisone acetate in 4 cc. of anhydrous tetrahydrofuran, a mixture of 1.4 cc. of ethyl orthoformate, 1.4 cc. of absolute ethyl alcohol and 15 mg. of p-toluenesulphonic acid is added. The mixture is stirred at room temperature for 45 minutes, then two drops of pyridine are added and the reaction medium is concentrated in vacuo. The residue crystallized from methanol yields 0.67 g. of 3-ethyl enol ether of 6-chloro cortisone acetate melting at 139–140° C.; $[\alpha]_D = 0$ (dioxan).

EXAMPLE 11

A mixture of 0.8 cc. of n-propyl orthoformate, 0.8 cc. of anhydrous n-propyl alcohol and 15 mg. of p-toluene-sulphonic acid is added to 0.3 g. of 6α-chloro cortisone acetate dissolved in 10 cc. of anhydrous tetrahydrofuran. The mixture is maintained at room temperature for 30 minutes with stirring, then concentrated in vacuo, after adding a drop of pyridine. The residue crystallized from methanol yields 0.195 g. of n-propyl enol ether of 6-chloro cortisone acetate; melting point 138–139° C. (dec.); $[\alpha]_D = -2 \pm 1$ (dioxan).

EXAMPLE 12

To 0.502 g. of 6α-chloro cortisone acetate dissolved in 2.5 cc. of anhydrous tetrahydrofuran, a mixture of 1 cc. of isopropyl orthoformate, 1 cc. of anhydrous isopropyl alcohol and 15 mg. of p-toluenesulphonic acid is added. The mixture is stirred for an hour at room temperature, then pyridine is added and the solvent evaporated. The residue crystallized from methanol yields 0.302 g. of 3-isopropyl enol ether of 6-chloro cortisone acetate; melting point 141° C. (dec.); $[\alpha]_D = -10 \pm 1$ (dioxan).

EXAMPLE 13

A mixture of 500 mg. of 6β-chloro cortisone acetate, 1.5 cc. of cyclopentyl alcohol and 10 mg. of p-toluenesulphonic acid is dissolved in 100 cc. benzene and the solution refluxed for 12 hours. Then a few drops of pyridine are added and the solvent is evaporated in vacuo. The residue crystallized from methanol, yields 0.35 g. of 3-cyclopentyl enol ether of 6-chloro cortisone acetate; melting point 146.5–147.5° C. (dec.);

$$[\alpha]_D = -9.5 \pm 0.5$$

(dioxan).

EXAMPLE 14

Similarly, there is prepared the ethyl, heptyl, cyclopentyl, cyclohexyl, β-chloroethyl, β-fluoroethyl, benzyl and phenyl 3-enol ethers of 6-methyl cortisone, 6-methyl hydrocortisone, 6-chloro cortisone, 6-chloro hydrocortisone, 6-fluoro cortisone, 6-fluoro hydrocortisone, 16α-methyl cortisone, 16α-methyl hydrocortisone, 16β-methyl cortisone, 16β-methyl hydrocortisone, 16α-hydroxy cortisone, 16α-hydroxy hydrocortisone, 16-methylene cortisone, 16-methylene hydrocortisone and the 9α-fluoro derivatives of cortisone, hydrocortisone and the above-enumerated derivatives thereof as well as the 21 acetates of all of said enol ethers.

EXAMPLE 15

12 g. of 3-enol n-propyl ether of cortisone propionate, previously micronized, are suspended in 800 cc. of a mixture of sesame oil and sunflowerseed oil. The mixture is heated on a water bath, the suspension being occasionally shaken and the temperature slowly raised until dissolution is completed. The clear and homogeneous solution is transferred into 0.8 cc. capsules so that each capsule contains about 15 mg. of 3-enol n-propyl ether of cortisone propionate. The capsules provide a safe pharmaceutical composition, effective for oral use.

EXAMPLE 16

Two parts of 3-enol ethyl of hydrocortisone acetate are dissolved in five parts of sesame oil and olive oil mixed by stirring and heating on a steam bath at about 55° C. After cooling, the solution is introduced into gelatin capsules of 0.5 cc. each, thus providing an oral hormonal composition which is very satisfactory for clinical use.

EXAMPLE 17

A mixture of 3-enol ethyl ether of cortisone (15 g.) and 3-enol ethyl ether of hydrocortisone (45 g.) is dissolved by gently heating in a mixture of corn oil and wheat germ oil (1:1) and filled into soft gelatin capsules.

EXAMPLE 18

In the same manner as in Examples 15–17, liquid oral compositions of (2-chloro) ethyl enolether of cortisone acetate are prepared by using sesame oil, olive oil and corn oil singly or in admixture as a liquid carrier.

EXAMPLE 19

Soft gelatin capsules are prepared containing from about 1.4 mg. to about 24 mg. of 3-enol propyl ether of hydrocortisone acetate in one milliliter of peanut oil.

EXAMPLE 20

A solid oral composition is prepared with the following ingredients:

|  | Mg. |
|---|---|
| 3-enol butyl ether of cortisone butyrate | 10 |
| Magnesium stearate | 30 |
| Magnesium oxide | 10 |
| Lactose | 90 |

The above ingredients are screened, mixed and filled into a gelatin capsule.

EXAMPLE 21

Tablets are prepared with the following components:

|  | Mg. |
|---|---|
| 3-enol hexyl ether of cortisone | 25 |
| Placebo granules | 130 |
| Magnesium stearate | 35 |
| Magnesium oxide | 10 |

The placebo granules are made of 55% lactose and 45% rich starch. 3-enol hexyl ether of cortisone is screened and added to the adjuvants. Tableting is done on a rotary machine.

EXAMPLE 22

An oral composition in powder form is prepared by mixing intimately 3-enol isopropyl ether of cortisone trimethylacetate (15 mg.), corn starch (35 mg.), lactose (40 mg.), talc, stearic acid, calcium carbonate (traces) and sugar coating (approximately 50 mg.).

EXAMPLE 23

The biological activity of some representative 3-enol ethers of cortisone acetate was determined in a number of the standard corticoid assays and compared with that of cortisone acetate.

The glucocorticoid activity was measured by glycogen deposition test in adrenalectomized female rats. On the fifth post-operative day the test substances were administered orally, at equimolecular doses, in 0.4 cc. of sesame oil solution. Seven hours after administration of the compounds the animals were killed and liver glycogen determined. The relative potency of the 3-enol ethers of cortisone acetate is given in Table I with cortisone acetate as the standard (potency=1).

The anti-inflammatory activity was determined by granuloma assay, induced in female albino rats by subcutaneous implantation of agar. The test substances were orally given for six consecutive days, at equimolecular doses, to groups of rats of twenty animals each in 0.2 cc. of sesame oil solution. On the seventh day the animals were killed and the subcutaneous implantations were carefully excised, the newly formed connective tissue was isolated and freed from agar residue, dried on filter paper and weighed. The weights of thymus, spleen and adrenals were also determined.

The results reported in Table I show that the enol ethers of cortisone acetate exhibit a significant increase in activity over cortisone acetate.

*Table I*

| Compound | Glucocorticoid activity | Anti-inflammatory activity |
|---|---|---|
| Cortisone acetate (standard) | 1 | 1 |
| 3-ethyl enol ether | 3.5 | 3 |
| 3-propyl enol ether | 3.8 | 3.2 |
| 3-isopropyl enol ether |  | 2.7 |
| 3-butyl enol ether | 2.7 | 2.3 |
| 3-isobutyl enol ether |  | 2.3 |
| 3-amyl enol ether | 2.1 | 2.3 |
| 3-hexyl enol ether | 2.0 | 2.1 |
| 3-heptyl enol ether |  | 2.3 |
| 3-(β-chloroethyl) enol ether | 5 | 4 |
| 3-(β-fluoroethyl) enol ether | 6 | 4 |

EXAMPLE 24

3-ethyl and propyl enol ethers of hydrocortisone acetate were tested so far as their anti-inflammatory, thymolitic and glucocorticoid activity is concerned by comparison with hydrocortisone acetate, in experimental animals. Relative potency is indicated in Table II.

*Table II*

| Compound | Thymolitic | Glucocorticoid activities | Anti-inflammatory |
|---|---|---|---|
| Hydrocortisone acetate | 1 | 1 | 1 |
| 3-ethyl enol ether | 4.9 | 3 | 2.8 |
| 3-propyl enol ether | 4.1 | 2.7 | 2.9 |

EXAMPLE 25

The oral anti-inflammatory and glucocorticoid activity of the 3-enol ethyl ether of cortisone was examined in comparison with that of Δ¹-cortisone as standard (potency=100), in experimental animals.

Similarly, 3-enol ethyl ether of hydrocortisone was compared in the biological assays with Δ¹-hydrocortisone as standard.

In Table III are tabulated the relative biological activities.

*Table III*

| Compound | Glucocorticoid activity | Anti-inflammatory activity |
|---|---|---|
| Δ¹-cortisone | 100 | 100 |
| 3-enol ethyl ether of cortisone | 90 | 130 |
| Δ¹-hydrocortisone | 100 | 100 |
| 3-enol ethyl ether of hydrocortisone | 95 | 85 |

The 3-enol ethers of cortison and hydrocortisone have a clinical utility in most conditions for which cortisone and hydrocortisone are effective with the main difference that the doses may be smaller because of the greater activity of the enol ethers.

I claim:

1. 3-(β-chloroethyl) enolether of cortisone acetate.
2. 3-(β-fluoroethyl) enolether of cortisone acetate.
3. An oral composition having enhanced adrenocortical effect comprising a steroid compound selected from the group consisting of 3-enolethers of $\Delta^4$-3-keto steroids having the cortisone side chain at $C_{17}$ and 21 esters thereof and a nontoxic pharmaceutical carrier therefor.
4. An oral composition as claimed in claim 3 in which said 3-enolether is an alkyl enolether.
5. An oral composition as claimed in claim 3 in which said 3-enolether is a cycloalkyl enolether.
6. An oral composition as claimed in claim 3 in which said 3-enolether is an aralkyl enolether.
7. An oral composition as claimed in claim 3 in which said steroid compound is the 3-propyl enolether of cortisone acetate.
8. An oral composition as claimed in claim 3 in which said steroid compound is 3-ethyl enolether of hydrocortisone.
9. An oral composition as claimed in claim 3 in which said 3-enolether is 3-(β-chloroethyl) enolether of cortisone acetate.
10. An oral composition as claimed in claim 3 in which said 3-enolether is 3-(β-fluoroethyl) enolether of cortisone acetate.
11. An oral composition as claimed in claim 3 in which the pharmaceutical carrier comprises at least one orally ingestible lipid.
12. An oral composition as claimed in claim 11 in which said lipid is selected from the group consisting of an oil and a fat having a high coefficient of digestibility.
13. A composition for oral use comprising a compound selected from the group consisting of 3-enolethers of cortisone and hydrocortisone and esters thereof and a carrier comprising at least one orally ingestible lipid, said composition being contained in a capsule composed of material soluble or disintegrable in the alimentary tract.
14. A composition for oral use in dosage unit form comprising from 0.1 mg. to 40 mg. of a steroid compound selected from the group consisting of 3-enolethers of $\Delta^4$-3-keto steroids having the cortisone side chain at $C_{17}$ and 21 esters thereof and a nontoxic pharmaceutical carrier therefor.
15. A process of conducting steroid therapy comprising administering daily to a human patient from 1 mg. to about 100 mg. of a steroid compound selected from the group consisting of 3-enolethers of $\Delta^4$-3-keto steroids having the cortisone side chain at $C_{17}$.

No references cited.